April 25, 1933.  E. B. MOORE  1,905,042

PRESSURE CONTROLLED VALVE

Filed Aug. 14, 1930

Patented Apr. 25, 1933

1,905,042

UNITED STATES PATENT OFFICE

EMMETT B. MOORE, OF EVANSTON, ILLINOIS

PRESSURE CONTROLLED VALVE

Application filed August 14, 1930. Serial No. 475,151.

This invention relates to a device for controlling or limiting the amount of fluid pressure to be admitted to a container, such as a pneumatic tire, and has for an object to produce a comparatively simple, compact, unitary device, that is accurate and positive in operation, and which is adapted to remain permanently secured on the stem of the tire during the entire time the tire is in actual use. Another object is to provide a device of this character which is relatively small in size and conveniently arranged for use and capable of being economically manufactured. A further object is to provide an improved device of this character having means permitting adjustment for accommodating various predetermined pressures within a substantial range. A further object is to provide in connection with a device of this character, a signal element that will produce an audible sound only while the compressed air is flowing into the tire. A still further object is to provide a novel mounting for the control device upon the tire stem which will tend to discourage and prevent theft of the device. It consists in certain features and elements of construction, in combination, as herein shown and described and as indicated by the claims.

In the drawing:

Figure 1 is an enlarged sectional view of a device embodying the present invention.

Figure 2 is a transverse sectional view taken substantially as indicated at 2—2 on Figure 1.

Figure 3 is a perspective view of the check valve element.

Figure 4 is a perspective view of the spring and lock nut assembly for the valve stem.

Figure 5 is a plan view of the signal element for producing an audible sound.

Figure 6 is a transverse section through the device taken substantially as indicated at line 6—6, on Figure 1.

Figure 7 is a sectional view of a portion of a tire equipped with a stem embodying a modified form of the invention.

Figure 8 is an enlarged sectional view similar to Figure 1, showing a still further modification of the invention.

Figures 9 and 10 are transverse sectional views taken substantially as indicated at lines 9—9 and 10—10, respectively, on Figure 8.

Figure 11 is a vertical sectional view of a cap used in connection with a valve stem equipped with a device embodying the present invention.

For the purpose of illustration the device embodying the present invention is shown in connection with the conventional nipple member, commonly called the stem; of a pneumatic tire, although it is to be understood that in general the device is capable of being adapted for controlling the amount of fluid pressure to be admitted to a large variety of containers. Referring now in detail to Figure 1 of the drawing, the device includes a casing, 10, having an integral tubular base, 11, interiorly threaded for mounting on a stem indicated generally at 12, of a pneumatic tire, (not shown). The casing includes a substantially cylindrical portion, 13, which is interiorly threaded and open at its bottom and with which co-operates a threaded annular cap, 14, for sealing the rear end of the device. For simplifying the assembly the exterior of said cap, 14, is formed with a centrally located slot, 15, for engagement by a screw driver or similar tool. The opposite end of the casing, 10, continues in a hollow neck, 16, which is disposed at an angle oblique to the axis of the stem, 12, and which has its outer end adapted for application of the usual air hose fitting or chuck for admitting compressed air to the device which controls its admission to the tire. The casing is formed with a substantially annular diaphragm chamber, 18, which is reduced at 19, and is again further reduced at 20, to form a port communicating with the valve chamber, 21, in the neck of the device.

Mounted in the annular part, 13, of the casing is a flexible diaphragm, 22, of any suitable material, such as rubber, preferably circular in outline, which has its outer periphery provided with a bead, 23, adapted to interlock in a co-operatively formed groove, 24, in the inside of said casing part, 13, and said diaphragm is secured at its outer edges by the inner end of the annular cap, 14, through the medium of an interposed annular washer, 25. As will be observed from Figure 1 of the drawing, the position of the diaphragm is such that a substantial portion of one of its surfaces is exposed to the pressure in the chamber, 18, while a valve carrier, 26, is disposed inside of the cap, 14, and has its head engaging substantially the entire under surface of the diaphragm. The carrier is provided with a sleeve, 26ª, extending through said diaphragm into the chamber, 18, and threaded on the upper end of said sleeve, 26ª, is a guide member, 27, having a body portion dimensioned to provide a snug telescopic fit in the reduced portion, 19, of the diaphragm chamber and formed with a flange base 27ª, which abuts against the exposed surface of the diaphragm. The carrier, 26, serves to reinforce the diaphragm and prevent its being damaged by exposure to relatively high pressures, and the diaphragm is preferably concavo-convex in cross section with the convex surface exposed to the diaphragm chamber, 18, which construction tends to minimize the stress at the outer edge of the diaphragm where it is secured; and by virtue of this formation the diaphragm has an inherent spring action, which assists in controlling a valve as will be presently described.

Threaded in the sleeve portion, 26ª, of the diaphragm carrier is the valve stem, 30, extending through the diaphragm and having its upper end provided with a valve element, 31, which co-acts with a valve seat, 32, formed in the valve chamber, 21, for controlling the reduced port opening, 20. The upper surface of this valve element, 31, is provided with a transverse slot, 33, for engagement by the end of a screw driver for adjusting the valve element in the carrier and varying the position thereof with respect to its co-operating seat. The valve carrier, 26, is provided with a plurality of legs, 26ᵇ, which slidably engage the inner surface of the cap, 14, and also assist in guiding the valve to and from its seat. The lower end of the cap, 14, is recessed, as at 14ª, to provide a seat for a helically coiled spring, 35, which acts against the under side of the valve stem carrier, 26, and tends to urge the diaphragm in the direction for maintaining the valve, 31, in open position, away from its seat. In order that the compressed air entering the neck of the fitting may be permitted to act directly on the diaphragm, the body of the element, 27, is provided with a plurality of external grooves or ducts, 27ᵇ, which extend into the flanged portion, 27ª, so as to provide a passageway communicating between the upper portion of the reduced chamber, 19, and the diaphragm chamber, 18. It will now be manifest that when compressed air is introduced into the neck of the fitting, it will act directly upon the top of the valve element, 31, and, entering through the ducts, 27ᵇ, will also act directly against the convex surface of the diaphragm and tend to move it downwardly so as to move the valve, 31, to its seat, against the reaction of the coil spring, 35. It will, of course, be understood that the tension of the spring, 35, is adjusted to a proper value to correspond to a desired predetermined pressure to be admitted to the container or tire, and when the predetermined pressure is attained in the container, it will cause closure of the valve, 31. When the diaphragm moves downward it tends to compress the air in the sealed chamber containing spring, 35, which produces a resilient action tending to restore said diaphragm to normal position, and in addition the resilient spring and also the formation of the diaphragm itself, both tend to return the diaphragm to normal shape and position. The adjustment of the spring, 35, for varying the desired predetermined pressure may be accomplished in various ways; as shown this is done by providing shims, 35ª, in the recess, 14ª, of the cap for reducing the extensibility of the spring, 35.

As indicated in the drawing, the flange, 27ª, of the guide element, 27, is dimensioned so that normally when the spring, 35, is permitted to act on the diaphragm and move the valve away from its seat, it will strike against the stop shoulder, 18ª, in the chamber, 18, of the casing and limit the outward movement of said valve with respect to its seat.

It may be understood that the device embodying the present invention may be adapted for use in connection with valve stems in which the usual check valve is provided or omitted, and will work equally well in either instance, assuming of course that adjustment of spring, 35, be such as to take into consideration the reduced or increased pressure necessary to proper operation in either of the respective cases. The passage for the compressed air into the container is by way of chambers, 21 to 18, and thence through a duct, 36, which opens off of the chamber, 18, and communicates directly with the passageway, 12ª, of the valve stem. The opening of the duct, 36, into the chamber, 18, is located so as to be substantially sealed by the diaphragm, 22, when the latter is in "valve-open" position, and is effectively opened for permitting flow of the air from said chamber, 18, when said diaphragm is moved downwardly by the pressure of the compressed air entering said chamber, 18.

For convenience in illustration, the usual check valve has been omitted from the tire stem, 12, and is shown as a part of my unitary device. The outer end of the neck, 16, is internally threaded and has seated therein an element, 40, having a central port, 41, which is slightly less in effective cross-sectional area than the effective cross sectional area of the passageway, 12ª, in the tire stem. This feature of construction is of great importance for insuring proper operation of the device, since it limits the volume of compressed air entering the device to an amount that will be easily accommodated by the inlet of the tire stem. The element, 40, is provided with an inwardly facing valve seat, 42, with which co-operates a check valve, 43, which is formed with a plurality of spaced lugs, 44, to provide a seat against which reacts a coil spring, 45, engaging against a stop shoulder, 16ª, in the casing, thus normally maintaining the valve against its seat, 42. To insure a perfect seal of the valves on their seats, each of the valve elements, 31 and 43, are preferably provided with inserts, 31ª and 43ª, of resilient material such as rubber, fiber, etc. The valve element, 43, is provided with an upstanding plunger, 46, which projects through port, 41, a substantial distance beyond the top of the element, 40, slightly beyond the end of the neck, 16. The end of the plunger is adapted to be engaged by a co-operatively formed part in a conventional form of chuck or fitting used in connection with compressed air hoses or conduits so that when the compressed air chuck or fitting is applied over the neck, 16, of the device the plunger, 46, is engaged and depressed so as to move the valve, 43, away from its seat and thus admit compressed air through the port, 41, into the valve chamber, 21. The upper surface of the element, 40, is preferably provided with a plurality of slots, 40ª, which in addition to serving to receive the end of a screw driver or like tool for threading it into proper position in the end of the neck, insure the entrance of the compressed air into the port, notwithstanding the fact that the co-operative element of the compressed air chuck may substantially cover the entire end of the port, 41.

It will be manifest that in the construction illustrated it will be necessary to remove the element, 40, together with its co-operative valve, 43, and spring, 45, in order to afford direct access to the head of the valve 31, to permit adjusting it relative to its seat to accommodate various predetermined pressures. Because of excessive vibrations of the entire control device when the same is in use on a tire, there might be a possibility of the valve, 31, being displaced so as to alter the desired predetermined pressure which it is to control. To positively secure this valve element in any of its positions of adjustment I provide a flat spring element, 50, mounted on the valve stem, 30, on the under side of the carrier, 26; a locking plate, 51, is interposed between the spring, 50, and said carrier so that when the nut, 54, is threaded tightly on the stem compressing the spring, 50, to a desired degree of tension, the wings, 51ª, of the locking plate, 51, are bent upwardly to engage the sides of the nut, 54, and thus lock it against rotation. To preclude slippage of the ends of the bow spring against the under side of the carrier, the carrier is preferably provided with grooves, 26ᶜ, for accommodating said ends of the spring.

The operation of the device as described is substantially as follows:

When the chuck of the compressed air conduit is applied to the neck, 16, of the device, the co-operative part of the chuck or fitting engages the end of the plunger, 46, and depresses the valve, 43, away from its seat, 42, and the compressed air then rushes through the port, 41, into the valve chamber, 21, and because of the fact that the valve, 31, is normally in open position the air then flows through the port, 20, and the ducts, 27ᵇ, of the guide element, 27, into the chamber, 18. The pressure exerted by this compressed air, reacts directly against the diaphragm, 22, and also against the end of the valve, 31, and the guide element, 27, tending to move the valve, 31, toward its seat. During this movement of the diaphragm the compressed air in the chamber, 18, flows through the duct, 36, by reason of the diaphragm moving away from the mouth or opening of said duct so that the compressed air then passes into said passageway, 12ª, and thence is admitted into the tire. If the pressure of the compressed air supply is considerably greater than that desired in the tire, it may set up a vibratory movement of the valve, 31, along with its diaphragm, and the constant vibration of this unit will naturally permit intermittent flow of air from the diaphragm chamber, 18, into the duct, 36, until the predetermined pressure has been built up in the tire and the duct, 36. Thus when this predetermined pressure is attained in the tire, the action of the pressure in the duct, 36, on the diaphragm, together with the greater pressure acting directly on the diaphragm and on the valve, 31, will be sufficient to overcome the spring, 35, and positively move the valve 31 to its seat and prevent admission of any more air into the tire.

To definitely indicate when the air in the tire has reached a predetermined pressure, I provide a signal device which, as herein shown, is in the nature of a disk element, 55, having a rectangular opening, 56, in which is disposed a reed or tine, 57, which is slightly smaller in size than the opening, 56. This element is disposed in the tubular base, 11, on top of the stem, 12, and preferably is backed by an undercut washer, 59, which accommodates movement of the tine, 57, through the disk element, 55, and a rubber washer, 60, is interposed between the washer, 59, and the top of the valve stem so as to insure a perfect seal between the control device and said valve stem of the tire. As the air rushes through the passages and enters the duct, 36, it will be forced to pass through the relatively small open area of the opening, 56, around the tine, 57, and the passage of air will thereby set up a vibratory action in the tine, 57, creating an audible sound or musical note, similar to that of a harmonica. Thus during the entire time that the compressed air is being admitted into the tire, this audible musical note will be produced, and just as soon as the predetermined pressure has been attained in the tire, causing closure of the valve, 31, and thereby stopping the flow of air past the tine, 55, the musical note will cease, thereby giving definite warning that the predetermined pressure has been attained in the tire.

To keep out grit and dirt from the device so as to insure proper operation of the valves of the device, the extreme end of the neck, 16, has a cap, 61, threaded thereon, with a sealing washer, 62, at the bottom, engaging the end of the neck. Said washer is provided with a central aperture, 63, for accommodating the plunger, 46, of the check valve.

To discourage theft of these control devices from pneumatic tires of vehicles, I preferably provide a special adapter element, or bushing, 65, which is threaded onto the upper end of the tire stem, 12, and permanently secured thereto by soldering or brazing, or as herein indicated by a pin, 66, so as to make the bushing a permanent part of the tire stem. The exterior of the bushing is provided with a special thread for receiving the co-operatively threaded tubular base, 11, of the device. It is my intention to normally limit each sale of such devices to include a complete device, together with my special bushing, and the bushings will not ordinarily be sold separately, unless the purchaser can show that he originally obtained a complete device and bushing, and that subsequently the original bushing was discarded along with a tire and its stem, or for other legitimate reason. With this method of construction the device cannot be used on the standard tire stem without a bushing.

The bushing, 65, is provided with a downwardly extending flange, 65$^a$, which fits snugly against a co-operatively tapered shoulder, 12$^b$, of the tire stem, and threaded on the exterior of the tire stem is a protector sleeve, 70, of substantially the same general contour as that commonly used, except that the top thereof is formed with an aperture, 71, for fitting it down over the bushing on the stem, and has a co-operatively beveled shoulder, 72. After the sleeve, 70, has been threaded tightly on the stem, 12, bringing its shoulder, 72, tightly onto the flange, 65$^a$, of the bushing, the fitting embodying this invention is then threaded onto the bushing with its flanged lower edge, 11$^a$, abutting the exterior of the beveled shoulder, 72, of the sleeve; then by turning the sleeve, 70, back (in "off" direction), its shoulder, 72, will be caused to bind tightly against the under side of the flange, 11$^a$, of the fitting and serve as a lock nut to positively hold the fitting in position on the stem.

Figure 7 illustrates a modified construction in which my control device is embodied as an integral part of the tire stem proper. In this construction the tire stem is formed in two parts, 80 and 81, and the upper part is reduced and threaded into the lower, as indicated at 82, so as to form a continuous stem of substantially the same size and proportions as the valve stems commonly in use. The casing, 83, of the control device is formed as an integral part of the lower valve stem member, 81, but is preferably of minimum depth and disposed on the inner side of the tire wall indicated at 84, and clamped in place by the nut, 85, on the lower end of the stem engaging the upper surface of the tire. The device in general is substantially the same as that embodied in the construction shown in Fig. 1, except that the duct, 87, leads directly from the diaphragm chamber, 18, into the interior of the tire. Preferably the dimensions of the device should be such as to permit the device to recede into the concavity of the tire rim in case of deflation of the tire, while on the wheel. The main purpose in making the valve stem in two parts is to facilitate assembly, and also to provide convenient access to the valve element, 31, with a screw driver for adjusting the same to a desired predetermined pressure. The upper portion of the valve stem, 80, preferably has a section of its exterior, as indicated at 80$^a$, formed of polygonal outline so as to permit engagement by a convenient tool for assembling the two valve parts. This upper section of the valve stem may be provided with any convenient form of check valve, such as that commonly in use, and as herein illustrated the check valve is substantially the same as that provided at the outer end of the neck, 16, shown in Figure 1.

Figure 8 discloses a further modification of the unitary device shown in Figure 1, and differs therefrom primarily in the fact that the guide element, 27$^x$, and the diaphragm carrier are disconnected so that the valve stem, 30ˣ, is not positively secured to the diaphragm. In this construction the diaphragm carrier, 26ˣ, is yieldingly held in contact with the under surface of the diaphragm by the coil spring, 35, and the guide element, 27ˣ, removably engages the upper surface of the diaphragm in the chamber, 18. This element, 27ˣ, is formed with exterior ducts, 27ᶻ, to provide connection between the inlet and chamber, 18, and is centrally threaded for receiving the end, 30ˣ, of the valve stem, and to insure that the valve element, 31ˣ, will remain in the desired position of adjustment or to permit its being adjusted with respect to its seat, the element, 27ˣ, is preferably provided with a pair of diametrically opposite tongues or keys, 27ʸ, which engage in co-operatively formed grooves or slots, 19ˣ, formed in the reduced part, 19, of the diaphragm chamber of the casing. Thus by rotation of the valve in threading it into or out of the element, 27ˣ, the valve will be positively moved toward or from its seat. To further insure against accidental displacement or misadjustment of the valve stem due to vibration, the valve proper, 31ˣ, is formed with a pair of diametrically opposite tongues or wings, 31ʸ, which engage in cooperatively formed slots, 90, of a sleeve, 91, disposed inside of the valve chamber, 21, which sleeve is firmly held against the stop shoulder, 16ᵃ, in said chamber by the threaded element, 41, serving as a seat for the check valve. In this construction the spring, 45, reacts directly between the valve element, 43, and the valve element, 31ˣ, and it may be here mentioned that normally the pressure exerted by the spring, 35, together with the concavo-convex diaphragm acting on the element, 27ˣ, is sufficient to hold the valve, 31ˣ, away from its seat, and thereby transmit the pressure through the medium of the spring, 45, for keeping the valve, 43, on its seat.

The operation of the device shown in Figure 8 is substantially the same as that described with respect to the device disclosed in Figure 1, with the exception that the valve, 31ˣ, is not positively connected to the diaphragm; hence when the diaphragm is moved downwardly due to the pressure of the compressed air, the guide element, 27ˣ, remains in contact with the diaphragm by virtue of the pressure exerted by the spring, 46. The admission of air to the stem or inlet of the container by way of the duct, 36, is controlled in substantially the manner above described.

I claim:

A device for connecting a sealed container with a source of fluid pressure comprising a stem having a flow passage through it and constituting a rigid part of said device and arranged to be permanently mounted in the container wall; a casing of which said stem is a rigid part arranged to be located within the container, said casing having a diaphragm chamber communicating with the passageway through the stem, and a duct providing communication between said chamber and the cavity of the container; a diaphragm in the casing having one side exposed to pressure in the chamber, the passageway through the stem being formed to provide a valve seat; a valve member co-acting with said seat for controlling flow through the stem passageway; a valve stem connected to the valve member and associated with the diaphragm for movement therewith in the pressure-responsive movement of the diaphragm, the valve being adjustable relatively to the diaphragm for varying the predetermined pressure necessary for moving the valve to closed position, said stem being formed with a detachable part at the portion of said stem outside the container to permit access to said valve for adjustment thereof; means normally urging the diaphragm in valve-opening direction, and a check valve mounted in the detachable portion of the stem arranged to open for inflow and seating against reverse flow.

EMMETT B. MOORE.